May 27, 1969  L. H. SOUTHWELL ET AL  3,446,119
FLUID PRESSURE RESPONSIVE CONTROL APPARATUS
Filed March 6, 1967  Sheet 1 of 2

INVENTORS
LESLIE H. SOUTHWELL
JOHN BJORKNAS
BY
Fetherstonhaugh & Co.
ATTORNEYS

INVENTORS
LESLIE H. SOUTHWELL
JOHN BJORKNAS
BY
ATTORNEYS

United States Patent Office 3,446,119
Patented May 27, 1969

3,446,119
FLUID PRESSURE RESPONSIVE
CONTROL APPARATUS
Leslie H. Southwell, 551 St. Andrews Road, West Vancouver, British Columbia, Canada, and John Bjorknas, 6576 Sussex Ave., South Burnaby, British Columbia, Canada
Filed Mar. 6, 1967, Ser. No. 620,772
Int. Cl. F15b 11/04, 13/02
U.S. Cl. 91—419      10 Claims

ABSTRACT OF THE DISCLOSURE

For use in a pressure fluid system, a fluid pressure responsive control apparatus adapted to be actuated or tripped in response to the rate of flow of the fluid to sense and react to an upper limit set on the flow through the apparatus.

---

Figure 1:
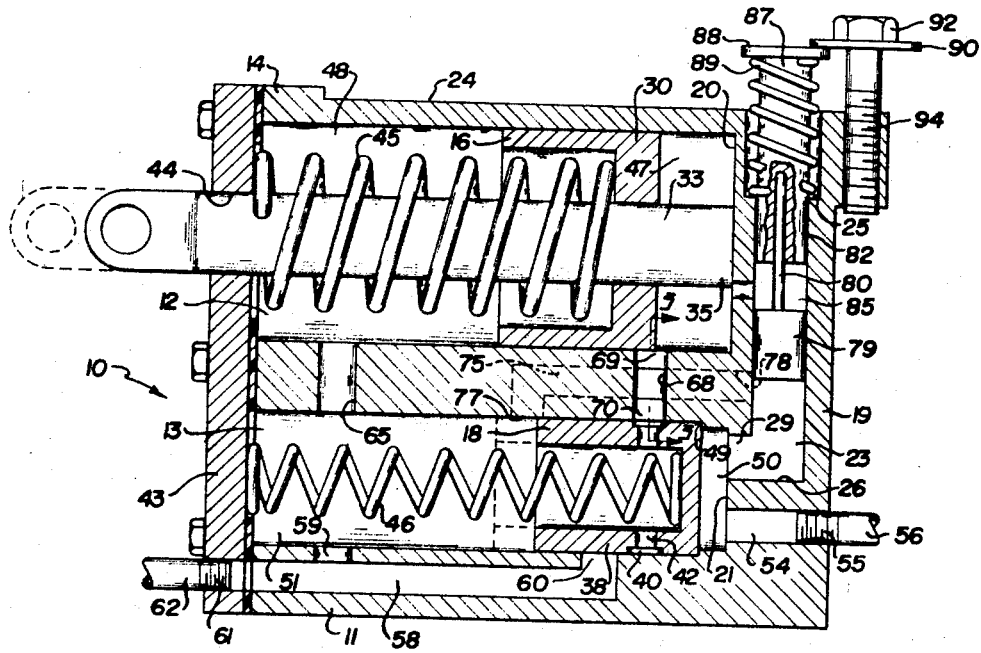

This invention relates to overspeed trip mechanism and in particular to a mechanism for sensing and reacting to variations of velocity used pressures in a fluid system.

Trip mechanisms which are actuated by variations in fluid pressure are usually arranged to be actuated upon changes to fluid pressure from whatever cause, and are therefore not suitable as trips for indicating or control purposes wherein fluid pressure may remain constant while velocity thereof may vary.

Furthermore, fluid actuated mechanisms of prior art, in order to accurately sense variations in flows and pressures in fluid, have been of very intricate design, and therefore are relatively expensive to manufacture and maintain.

The present invention provides a trip mechanism for a fluid system which, regardless of the total pressure in the system, will only be actuated or tripped when the rate of flow of the fluid exceeds a predetermined value.

The present invention, furthermore, provides a trip mechanism which is of very simple design and therefore relatively inexpensive to manufacture and maintain.

The present invention comprises a power cylinder, a power piston in said cylinder, first resilient means urging the piston towards one end of the cylinder, a pilot cylinder having a head end adapted to be connected in the fluid supply system, said pilot cylinder having a fluid intake port at the head end and a fluid discharge port spaced from said head end, an elongated pilot piston in the pilot cylinder having a slidable sealable fit to the wall of the latter, a fluid by-pass passage having an inlet port at the head end of the pilot cylinder and a discharge port spaced from said head end a distance greater than the length of the pilot piston, said fluid by-pass passage having a fluid restricting orifice adapted to provide fluid pressure upstream thereof lying in direct relationship with the rate of flow of fluid therethrough, a fluid transfer passage having an inlet port located in the wall of the pilot cylinder spaced from the outlet port of the by-pass passage towards the head end of the said pilot cylinder a distance greater than the length of the pilot piston, second resilient means in the pilot cylinder urging the pilot piston towards the head end of the pilot cylinder, said second resilient means being adapted to maintain the piston in a normal position against the pressure of the fluid at the head end of the pilot cylinder clear of the outlet port of the by-pass passage so as to divert the fluid through the latter and being adapted to yield at a predetermined fluid pressure to permit the pilot piston to move to a position across and block the outlet port of said by-pass passage and clear of the inlet port of the transfer passage to permit the fluid to enter the power cylinder and operate the power piston, means to limit the movement of the power piston under the action of the fluid, said resilient means being adapted after the power piston is moved to its limit to yieldably permit the pilot piston to move clear of the discharge port of the pilot cylinder.

Figure 3:
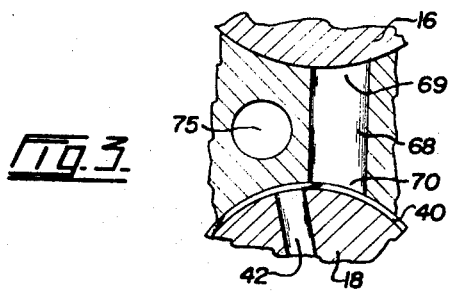
Figure 5:
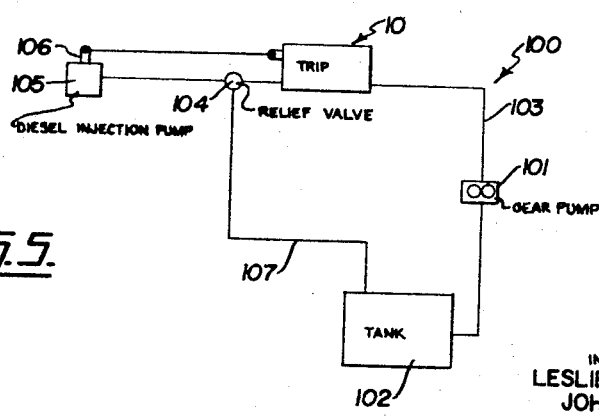
Figure 2:
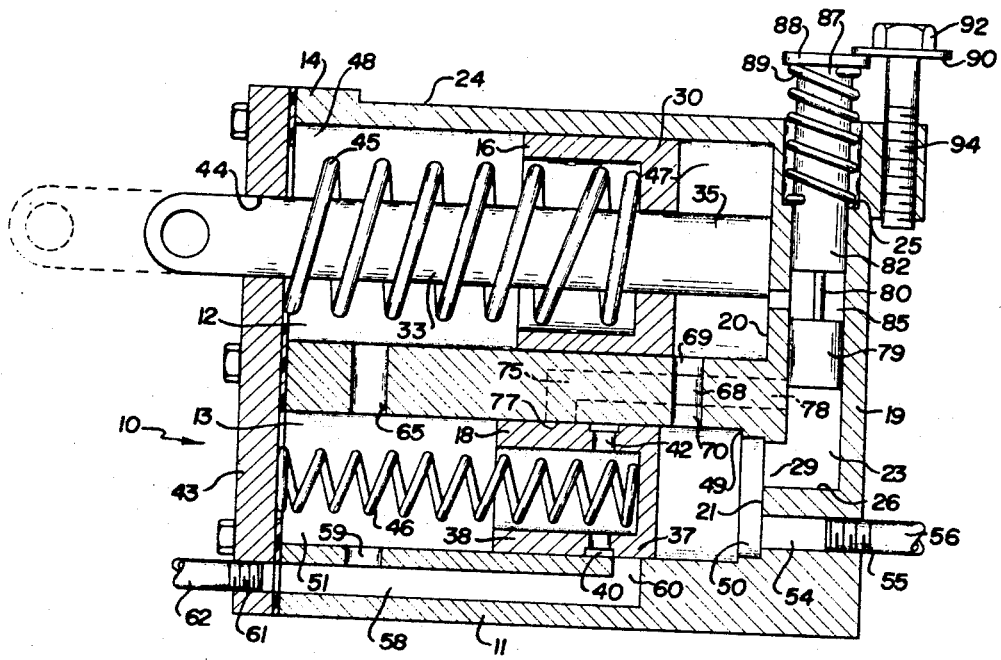
Figure 4:
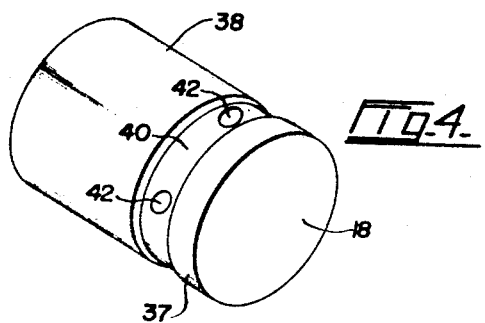
Figure 6:
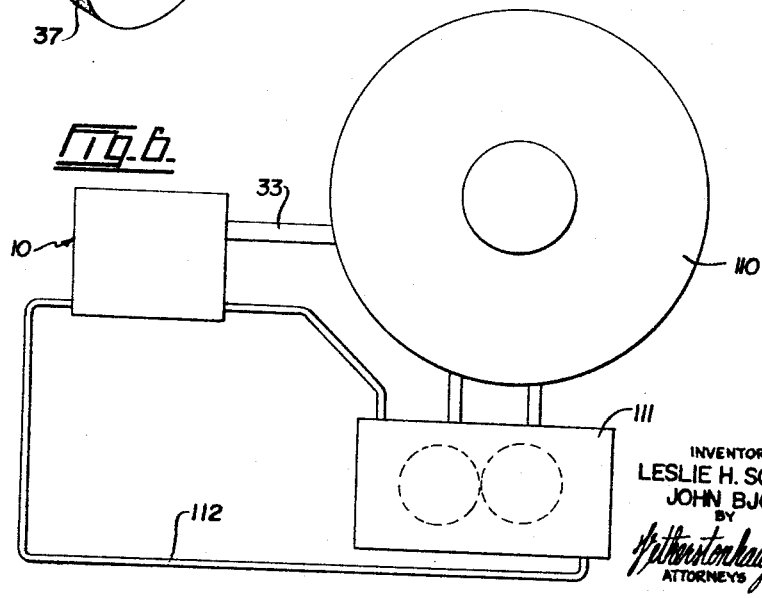

In the drawings which illustrate the invention,

FIGURE 1 is a central sectional side view of the trip mechanism illustrating the position of its components in a normal or untripped condition, FIGURE 2 is a view similar to FIGURE 1 illustrating in solid lines, the position of the component parts at the commencement of a tripping operation, and in dotted lines in the position assumed by the component parts in a fully tripped condition, FIGURE 3 is a sectional view of a portion of the mechanism taken along line 3—3 of FIGURE 1, FIGURE 4 is an isometric view of a portion of the invention, FIGURE 5 is a schematic diagram of a fuel system for a diesel injection engine having the trip mechanism installed, and FIGURE 6 is a schematic diagram illustrating the use of the trip mechanism in association with a pulley wheel.

Referring to the drawings, in particular to FIGURES 1 and 2 thereof, the trip mechanism herein accorded the numeral 10 for identification comprises a substantial rectangular casing 11 having a pair of large diameter longitudinally extending bores 12 and 13 formed therein, said bores opening out of one end 14 of said casing.

Bore 12 is larger in diameter than bore 13 and serves as a power cylinder having a power piston 16 reciprocally slidable therein. Bore 13 serves as a pilot cylinder and has a pilot piston 18 reciprocally slidable therein. Both these bores terminate short of the other end 19 of the casing forming end walls 20 and 21 respectively. Between the end 19 and these end walls 20 and 21 of the power and pilot cylinders 12 and 13 respectively, is formed a transversely extending bore or passage 23, said bore 23 opening outwardly out of side wall 24 of the casing. The open end of this bore 23 is counterbored to provide an interior annular shoulder 25. The other end 26 of this bore 23 terminates at approximately the centre line produced of pilot cylinder 13, and communicates with pilot cylinder 13 via a passage 29 formed through the wall 21.

Power piston 16 is of hollow construction having a head 30 and is connected to an operating rod 33 which extends coaxially of the power cylinder 12 out of the open end thereof, said rod 33 having a portion 35 extending beyond the head 30 of the piston.

Pilot piston 18, as illustrated in FIGURE 4, is also of hollow construction having a head 37 and an annular skirt 38, the skirt slidably and sealably contacting the walls of the pilot cylinder 13. This pilot piston also has formed therein an outer circumferential groove 40 adjacent its head 37 and extending between the groove 40 and the interior of the piston are formed a plurality of short passages 42.

The open ends of both cylinders 12 and 13 are closed by a cover plate 43 bolted to the end 14 of the casing, said cover plate having an aperture 44 formed therein through which the rod 33 slidably and sealably extends.

Helical compression springs 45 and 46 are fitted under compression in the cylinders 12 and 13 respectively between the cover plate 43 and the pistons 16 and 18, urging the latter towards walls 20 and 21. The free end of the portion 35 of the rod 33 will engage end wall 20 of the power cylinder 13, and maintain the head of power piston 16 spaced apart therefrom. The power piston 16 will be maintained in spaced apart relationship from wall 20 by the engagement of the latter with the free end of the portion 35 of the rod 33, thereby forming an annular head chamber 47 and an annular tail chamber 48. The pilot cylinder 13 is reduced in diameter adjacent the wall 21 to form an inner annular shoulder 49 against which the helical spring 46 urges the pilot piston 16, thereby spacing the latter from said wall 23 to form a head chamber 50 and a tail chamber 51.

The most advanced positions assumed by the pistons 16 and 18 under the action of the springs 45 and 46, are illustrated in FIGURE 1, and for the purposes of the specification and claims following, shall be deemed to be the normal or non-tripped positions of these pistons.

Fluid is emitted into head chamber 50 via a fluid passage 54 formed through the casing and opening into said head chamber through the wall 23. This fluid passage 54 is preferably threaded as at 55 to threadedly receive a fluid conduit 56. An elongated passage 58 is formed in the casing extending longitudinally of and adjacent pilot cylinder 13, said passage 58 having two ports 59 and 60 formed through the wall of the pilot cylinder and in longitudinally spaced apart relationship. Port 59 provides communication between the passage 58 and tail chamber 51 when the pilot piston 18 is in its normal position, while the port 60 is normally covered by the pilot piston when the latter is in said normal position. This passage 58 registers with a passage 61 formed through the cover plate 43 and into which a fluid conduit 62 may be threadedly inserted.

A fluid relief passage 65 is formed through the casing extending between and ported into tail chambers 48 and 51 to provide fluid communication between the latter. Further fluid communications between the two cylinders is also provided by means of a fluid transfer passage 68 (see FIGURE 3) which is ported at one end 69 into head chamber 47 at its other end 70 through the wall of the pilot cylinder 13, said port 70 being located in registry with the circumferential groove 40 when the pilot piston 18 is in its normal position as illustrated in FIGURE 1.

Formed through the casing and extending longitudinally of pilot cylinder 13, is a fluid by-pass passage 75 (see FIGURE 3) ported at one end 77 through the wall of said pilot cylinder just aft of the tail end of the pilot piston 16 when the latter is in its normal position, and ported at its other end 78 into the bore 23 adjacent the other end 26 thereof. This bore 23 is closed by a cylindrical plunger 79 having a slidable sealable fit with the walls of the bore 23, said plunger 79 having a thin metallic strut 80 extending towards the open end of the bore and centrally thereof. A cylindrical elongated plug 82 slidably and sealably fits at one end 83 into the open end of the bore 23 and has formed in said end 83 a socket 84 into which the strut 80 fittedly extends, the socket 84 being shorter than the strut so that the plunger 79 is spaced from the plug 82 to form an annular chamber 85 therebetween. At the other end 87 of the plug 82, there is formed an extending flange 88 and located over the plug and extending under compression between the flange 88 and annular shoulder 25 is a helical spring 89 normally urging the plug in a direction outwardly of the bore 23 and into engagement with the flanged head 90 of a machine bolt 92, the latter having a screw threaded fit in a suitably threaded socket 94 formed in the casing. Rotation of the machine bolt 93 one way or the other will, it will be seen, result in longitudinal movement of the plug 82 and plunger 79 relative to the bore 23. This will permit manual adjustment of the position of the plunger 79 relative to the port 78 so as to permit adjustment of the effective fluid passing area of the latter.

The trip mechanism 10 is designed for use in a fluid system wherein the fluid is transported by a closed conduit from a pump of the positive type, for example, a gear pump, whereby the flow is uniform or non-pulsating. The fluid, under normal flow conditions, enters the head chamber 50 of the pilot cylinder through the conduit 56, thence through passage 29 and by-pass passage 75 into the tail chamber 51 and out through port 59 back into the fluid system through conduit 62. This fluid will fill the tail chamber 51 and enter the power cylinder 12 via passages 65 and 68, filling both head chamber 47 and tail chamber 43 of said power cylinder.

The plunger 79 may be positioned as outlined foregoing partially across the port 78 of the by-pass passage thereby forming a flow restricting orifice so as to cause a pressure drop across the orifice. This will produce higher fluid pressure in the head chamber 50 than in tail chamber 51. The difference in total pressure on both sides of the pilot piston under normal flow conditions is balanced by the action of the spring 46. As the rate of flow increases, the fluid pressure in head chamber 50 will correspondingly increase until the total pressure exerted upon the pilot piston in chamber 50 will exceed the total pressure of the fluid and spring 46 in tail chamber 51, thereby moving the piston against said spring. The pilot piston 18 will move across and close port 77 and, at the same time, move clear of port 70 (as shown in solid lines in FIGURE 2). By-pass passage 75 will therefore be closed and transfer passage 68 opened to permit the fluid to enter head chamber 47 of the power cylinder, thereby moving the power piston against the spring 45, the fluid in tail chamber 48 thereof escaping through the passage 65 into the tail chamber 51 of the pilot cylinder and then outwardly through port 59 into passage 58 and outwardly through conduit 62. When the power piston has moved against the spring 45 to its fullest extent as obtained by full compression of the spring, the pressure build-up in head chamber 50 will continue to move the pilot piston until the latter clears port 60, thereby placing passage 58 and passage 54 in direct communication with each other.

Movement of power piston 16 will result in corresponding movement of piston rod 33. The movement of the latter may be utilized to operate a signal to indicate that the trip mechanism has tripped, or be utilized to effect the operation of equipment with which the pump may be associated.

It will be appreciated that variations in volatility caused by variations in temperature of a fluid pumped through a flow restricting orifice will, for the same pressure drop across the orifice, result in varied rates of flow. In order to provide for operation of the trip mechanism at the same rate of flow of fluid regardless of its temperature, the annular chamber 85 is placed in communication with head chamber 47 through a small vent 97 formed through end wall 20 so that said annular chamber 85 will always be filled with the fluid passing through the trip mechanism. As the strut 80 is metallic and has a co-efficient of expansion, any increase in the temperature of the fluid will result in expansion of said strut and a corresponding movement of the plunger 79 further across the port 78 so as to compensate for the increase in volatility of the fluid, thereby maintaining a substantially constant relationship of fluid pressure in head chamber 50 of the pilot piston and the rate of fluid flow through the bypass passage 75.

It will be appreciated that the length, size and composition of the strut 80 will be dependent upon the type of equipment with which the mechanism is to be used and the fluid to be transported.

FIGURE 5 illustrates schematically the employment of the trip mechanism 10 in the fuel supply system of a diesel engine, the latter being illustrated schematically and accorded the numeral 100. This engine normally utilizes a gear pump 101 which is geared directly to the crankshaft of the engine so that the speed of the gear pump is proportionate to the speed of the engine. The gear pump 101 draws fuel from a tank 102 and delivers fuel via a conduit 103 through a spring-urged relief valve 104 to a diesel injection pump 105 and into the cylinders of the engine. The fuel delivered by the injection pump into the engine is normally controlled by a throttle rack 106. The gear pump normally delivers more fuel than is required, the excess fuel being let off through the relief valve 104 and returned via conduit 107 to the tank 102. It is normally the practice to fit diesel engines with governors, not shown, which are responsive to the overspeed variations of a rotatable part of the engine and which are linked to the throttle rack 106 to reduce the fuel delivered into the engine, should the engine overspeed. The conventional governors now used are relatively slow in operation, and very often fail to react quickly enough and thereby permit an excessive amount of fuel to be delivered to the engine, thereby causing the latter to race.

The trip mechanism 10 which is installed in conduit 103 between the gear pump and valve 104, senses engine overspeeds through the increase in the rate of flow of fluid delivered by the gear pump and by proper setting of the plunger 79 may be adjusted so that it will trip instantly when the rate of flow of fluid exceeds a predetermined amount. The rod 33 may be connected directly to the throttle rack 106 as illustrated to immediately shut off the flow of fluid into the engine or it may be connected to air controls with which most diesel engines are equipped to shut off the supply of air to the engine.

The flow of fluid from the gear pump which is driven directly by the engine is not hindered in any way by the mechanism 10 during the tripping thereof nor after the tripping, and therefore permits the fluid to flow from the gear pump through the relief valve and back to the tank as the engine gradually comes to a stop.

After the engine and gear pump have stopped, the normal back leakage through the gear pump will permit the springs 45 and 46 to return their respective pistons to a non-tripped position.

The trip mechanism 10 may be employed to sense and react to any overspeed variation of any apparatus having a rotatable port and to which a positive type of pump may be directly connected to cause overspeed variations in rate of flow of a fluid through a conduit system, the latter being independent of the apparatus itself. The application of the trip mechanism in the latter instance is illustrated diagrammatically in FIGURE 6 wherein the numeral 110 identifies a pulley wheel driven in any suitable manner, not shown, and to which a gear pump 111 is directly connected. Fluid may be circulated from the discharge side of the pump directly to the intake side of the pump through a conduit 112, and the trip mechanism 10 connected directly into said conduit and the rod 33 thereof connected to a suitable braking mechanism, not shown, which when the mechanism 10 is tripped may be arranged so as to apply a brake to the pulley 110 so as to either stop the latter suddenly or bring it to a gradual stop.

What we claim as our invention is:

1. Overspeed trip apparatus for sensing and reacting to overspeed variation of fluid flow in a fluid supply system having a pressure pump comprising a power cylinder, a power piston in said cylinder, first resilient means urging the piston towards one end of the cylinder, a pilot cylinder having a head end adapted to be connected in the fluid supply system, said pilot cylinder having a fluid intake port at the head end and a fluid discharge port spaced from said head end, an elongated pilot piston in the pilot cylinder having a slidable sealable fit to the wall of the latter, a fluid by-pass passage having an inlet port at the head end of the pilot cylinder and a discharge port spaced from said head end a distance greater than the length of the pilot piston, said fluid by-pass passage having a fluid restricting orifice adapted to provide fluid pressure upstream thereof, a fluid transfer passage having an inlet port located in the wall of the pilot cylinder spaced from the discharge port of the by-pass passage towards the head end of the said pilot cylinder a distance less than the length of the pilot piston, second resilient means in the pilot cylinder urging the pilot piston towards the head end of the pilot cylinder, said second resilient means being adatped to maintain the piston in a normal position against the pressure of the fluid at the head end of the pilot cylinder clear of the discharge port of the by-pass passage so as to divert the fluid through the latter and being adapted to yield at a predetermined fluid pressure to permit the pilot piston to move to a position in which it extends across and thereby blocks the discharge port of said by-pass passage and in which it lies clear of the inlet port of the transfer passage to permit the fluid to enter the power cylinder and operate the power piston, and means to limit the movement of the power piston under the action of the fluid, said pilot piston resilient means being adapted after the power piston is moved to its limit to yieldably permit the pilot piston to move clear of the discharge port of the pilot cylinder.

2. Overspeed trip apparatus as claimed in claim 1 including manually adjustable means for adjusting the effective fluid passing area of the orifice.

3. Overspeed trip apparatus as claimed in claim 2 including thermo-sensitive means associated with the manually adjustable means and being responsive to the temperature of the fluid for altering the effective fluid passing area of the orifice.

4. Overspeed trip apparatus as claimed in claim 2 in which the manually operated adjustable means comprises a bore intersecting the by-pass passage, a plunger in the bore slidable into and out of the by-pass passage for altering the effective fluid passing area of the latter, and means for adjusting the position of the plunger with respect to the by-pass passage.

5. Overspeed trip apparatus for sensing and reacting to overspeed variation of fluid flow in a fluid supply system having a pressure pump comprising a casing having a pair of bores closed at both of their ends, one of said bores constituting a power cylinder and the other a pilot cylinder, said cylinders each having a head and a tail end, a power piston in the power cylinder having a piston rod secured thereto and slidably extending through the tail end of said power cylinder, an elongated pilot piston in the pilot cylinder having a slidable sealing fit through its length with the walls of said pilot cylinder, resilient mean urging both pistons towards the head ends of their respective cylinders to a normal position adjacent its space from said head ends whereby each of said cylinders is divided into a head chamber and a tail chamber, means connecting the head chamber of the pilot cylinder into the fluid supply system, said means including an intake port in the head end of the pilot cylinder and a discharge port spaced reawardly of the pilot piston when the latter is in its normal position, a fluid-by pass passage for permitting fluid flow between both chambers of the pilot cylinder when the latter is in its normal position, said by-pass passage having a restricted fluid passing orifice so as to pressurize the fluid in the head chamber of the pilot cylinder, a transverse passage formed in the casing having an inlet port in the wall of the pilot cylinder at a location normally covered by the pilot piston when the latter is in its normal position, and having a discharge portion opening into the head chamber of the power cylinder, a vent passage between the tail chambers of both cylinders, said resilient means which act on the pilot piston being adapted to maintain the latter in its normal position under a predetermined maximum fluid pressure in the head chamber of the pilot cylinder and being adapted to resiliently yield when the fluid pressure in said last-mentioned head chamber exceeds said predetermined maximum pressure to thereby permit the pilot piston to move and uncover the intake port of the transfer passage and at the same time close the discharge port of the by-pass passage so as to direct the pressurized fluid into the head chamber of the pilot cylinder and thereby move the power piston against the resilient means acting thereon, said pilot piston, after full movement of the power piston, being adapted to move under the pressure of the fluid to uncover the discharge port of the pilot cylinder.

6. Overspeed trip apparatus as claimed in claim 5 including means to adjust the size of the orifice, said means including a small diameter bore intersecting the by-pass passage at said orifice, a plunger slidable in said small diameter bore for moving into and out of the by-pass passage, and means for adjustably positioning the plunger relative to said by-pass passage.

7. Overspeed trip apparatus as claimed in claim 6 in which said means is manually adjustable.

8. Overspeed trip apparatus as claimed in claim 7 including thermo-sensitive means responsive to the temperature of the fluid for altering the position of the plunger independently of the manually adjustable means.

9. Overspeed trip apparatus as claimed in claim 8 in which said thermo-sensitive means comprises a thermo-expansible and contractable strut between the manually adjustable means and plunger forming a chamber between the latter, passage means formed through the pilot piston having a port at the tail end of the latter and a port in the side wall of the latter, said last-mentioned port registering with the inlet port of the transfer passage when the pilot cylinder is in its normal position to permit fluid communication between the tail end chamber of the pilot cylinder and the head end chamber of the power piston, and a fluid passage formed through the casing between the head chamber of the power cylinder and the annular chamber.

10. Overspeed trip apparatus for sensing and reacting to overspeed variation of fluid flow in a fluid supply system having a pressure pump comprising a pair of elongated cylinders, one of them being connected to the fluid supply system having an intake port at one end and a discharge port at the other, a pilot piston in one cylinder having a slidable sealable fit with the wall of the latter, a power piston in the other cylinder having a slidable sealable fit with the wall of the latter, rsilient means urging the pilot piston to a normal position adjacent the intake ported end of the pilot cylinder, a by-pass passage having an inlet port and an outlet port in the wall of the said one cylinder clear of the opposite ends of the pilot piston when the latter is in its normal position to permit the passage of fluid therethrough, said by-pass passage having a restriction to restrict the passage of fluid therethrough so as to pressurize the fluid between the inlet port end of said one cylinder and the piston, a fluid transfer passage between the cylinders having an inlet port normally closed by the pilot piston when the latter is in its normal position, said pilot piston resilient means being adapted to yield when the pressure of the fluid upstream of the by-pass passage exceeds a predetermined value to thereby permit the pilot piston to move to a position in which it simultaneously closes the discharge port of the by-pass passage and opens the inlet port of the transfer passage to permit the pressurized fluid to escape into the other cylinder and thereby operate the power piston.

References Cited

UNITED STATES PATENTS

| | | | |
|---|---|---|---|
| 2,477,710 | 8/1949 | Worstell | 91—452 |
| 2,854,957 | 10/1958 | Svingor et al. | 91—452 |
| 3,145,734 | 8/1964 | Lee et al. | 91—468 |
| 3,370,512 | 2/1968 | McRae | 91—452 |

PAUL E. MASLOUSKY, *Primary Examiner.*

U.S. Cl. X.R.

91—452, 469